(12) United States Patent
Pourghorban Saghati et al.

(10) Patent No.: US 12,482,932 B2
(45) Date of Patent: Nov. 25, 2025

(54) WIRELESS CIRCUITRY ACCESS SWITCH

(71) Applicant: Apple Inc., Cupertino, CA (US)

(72) Inventors: Alireza Pourghorban Saghati, San Jose, CA (US); Ali N Ergun, Sunnyvale, CA (US); Mohammed W Mokhtar, Campbell, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 18/474,012

(22) Filed: Sep. 25, 2023

(65) Prior Publication Data

US 2025/0105502 A1    Mar. 27, 2025

(51) Int. Cl.
*H01Q 3/24* (2006.01)
*H01Q 1/22* (2006.01)

(52) U.S. Cl.
CPC ............. *H01Q 3/24* (2013.01); *H01Q 1/2283* (2013.01)

(58) Field of Classification Search
CPC ............ G01R 31/2822; G01R 31/2884; H01Q 1/2283; H01Q 3/24; H04B 17/00
See application file for complete search history.

(56) References Cited

U.S. PATENT DOCUMENTS

2023/0028370 A1    1/2023    Pourghorban Saghati et al.

OTHER PUBLICATIONS

U.S. Appl. No. 17/886,678, filed Aug. 12, 2022.

*Primary Examiner* — Thien M Le
(74) *Attorney, Agent, or Firm* — Treyz Law Group, P.C.; Tianyi He

(57) ABSTRACT

An electronic device may include one or more radios and one or more antennas. The electronic device may include an input-output interface for connecting to a radio or an antenna. To facilitate selective external connections to the radio and the antenna, the electronic device may include a switch having a first terminal coupled to the radio, a second terminal coupled to the antenna, and a third terminal coupled to the input-output interface. The switch may be controlled to connect any two terminals of the three terminals to provide the corresponding connection, thereby facilitating the desired external connection(s) in some scenarios while enabling wireless circuitry operation with the radio and the antenna in other scenarios.

20 Claims, 7 Drawing Sheets

WIRELESS CIRCUITRY ACCESS SWITCH

FIELD

This disclosure relates generally to electronic devices, including electronic devices with wireless circuitry.

BACKGROUND

Electronic devices can have wireless capabilities. An electronic device with wireless capabilities can have wireless circuitry that includes one or more antennas and one or more radios. A transmission line can connect a radio to a corresponding antenna.

However, portions of the wireless circuitry can often be difficult to access, e.g., for calibration, testing, debugging, etc. It can be challenging to design satisfactory connections to the wireless circuitry.

SUMMARY

An electronic device may include one or more radios and one or more antennas. The electronic device may include input-output interface circuitry for connecting radio(s) and antenna(s). In particular, the electronic device may include a switch having a first terminal coupled to the radio, a second terminal coupled to the antenna, and a third terminal coupled to the input-output interface circuitry.

In one illustrative implementation, the electronic device may include a system package having radio and non-radio components mounted to a package substrate. The system package may also have the antenna integrated thereon. The system package may be mounted to a system substrate through which other components of the electronic device are connected. The input-output interface circuitry may include an interposer on the package substrate through which the radio components such as a radio and/or the antenna on the system package can be connected (via the switch). The switch may be mounted on the package substrate. The interposer may provide exterior-facing electrical contacts for the system package. Components external to the system package may connect to and access internal radio components and/or antennas through these exterior-facing electrical contacts. The system substrate may include connections to the electrical contacts of the interposer that are provided at corresponding on-substrate contacts at the system substrate. External devices or equipment such as calibration, testing, and/or debugging equipment may connect to the internal radio components and/or antennas through these on-substrate contacts when the switch is placed in one or more appropriate states.

An aspect of the disclosure provides an electronic device. The electronic device can include a radio, an antenna coupled to the radio, and an input-output interface for connecting to at least one of the radio and the antenna. The electronic device can include a switch having a first terminal coupled to the radio, a second terminal coupled to the antenna, and a third terminal coupled to the input-output interface.

An aspect of the disclosure provides an integrated circuit package. The integrated circuit package can include a substrate. The integrated circuit package can include a radio component on the substrate, an antenna coupled to the radio component, an interposer on the substrate, and a switch on the substrate. The switch can have a first terminal coupled to the radio component, a second terminal coupled to the antenna, and a third terminal coupled to the interposer.

An aspect of the disclosure provides wireless circuitry. The wireless circuitry can include a radio-frequency module, an antenna coupled to the radio-frequency module, and interface circuitry coupled to the radio-frequency module and coupled to the antenna. The wireless circuitry can include a switch having a first state in which the switch connects the radio-frequency module to the antenna, a second state in which the switch connects the radio-frequency module to the interface circuitry, and a third state in which the switch connects the antenna to the interface circuitry.

DETAILED DESCRIPTION

Figure 1:
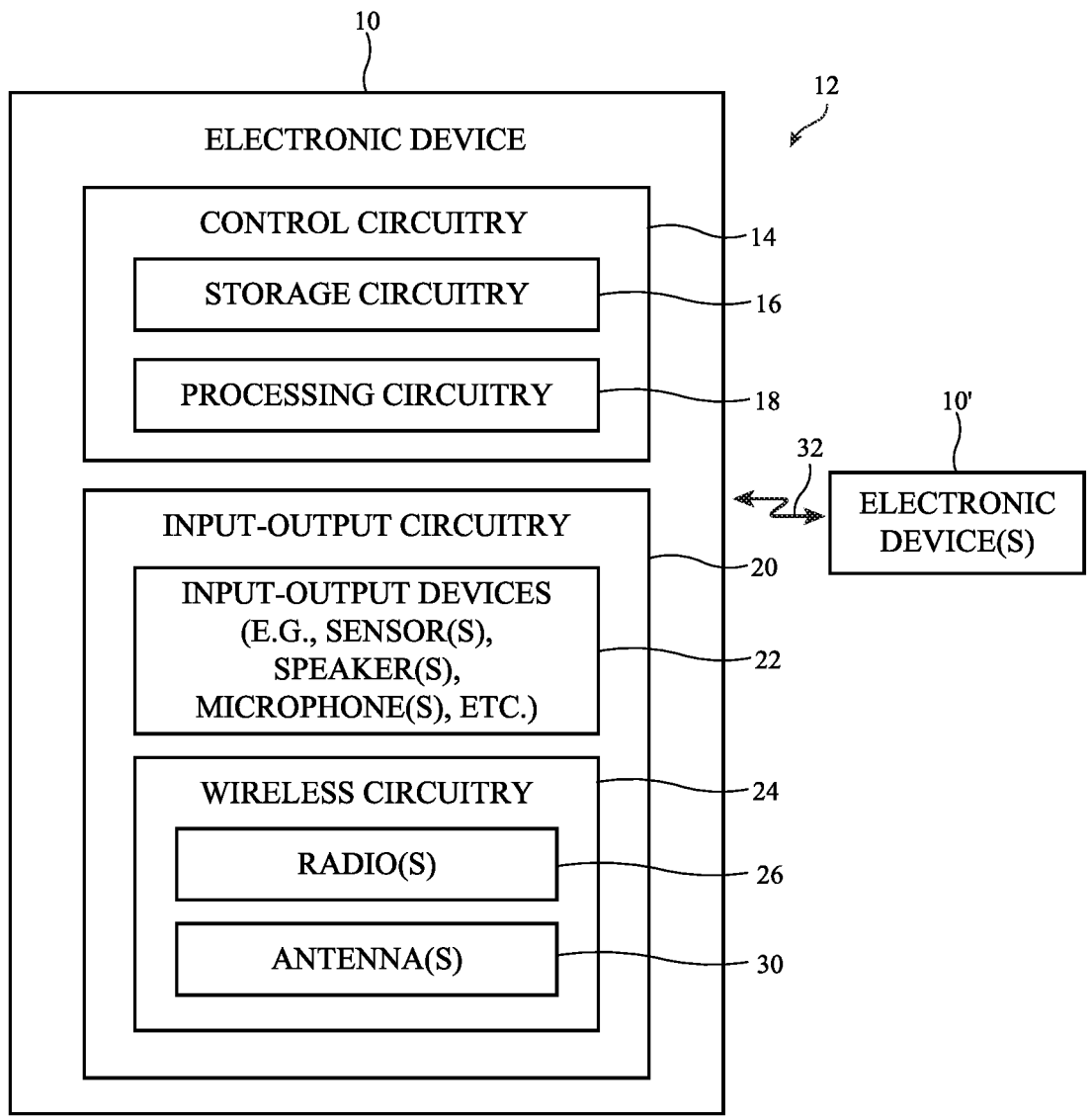
FIG. 1 is a block diagram of an illustrative electronic device having wireless circuitry in accordance with some embodiments.

An electronic device such as electronic device 10 of FIG. 1 may be provided with wireless circuitry. The wireless circuitry may include one or more radios and one or more antennas. A radio may be coupled to a corresponding antenna. In particular, a radio-frequency transmission line may convey radio-frequency signals between the radio and the antenna.

When the radio and the antenna are implemented in a closely integrated and closed system (e.g., disposed on and/or within a same package), it may be difficult to external systems, equipment, devices, and/or components to access the radio and/or antenna. Accordingly, to facilitate access as well as not disturb the regular conveyance of radio-frequency signals between the radio and antenna, the wireless circuitry may a switch having a first terminal coupled to the radio, a second terminal coupled to the antenna, and a third terminal coupled to interface circuitry. Through the interface circuitry, external devices or equipment may connect to the radio and/or the antenna via the switch. This may help facilitate calibration, testing, debugging, and/or other actions to be performed for the wireless circuitry, as examples.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device such as an earbud, a pair of earbuds, or a pair of earbuds with a corresponding case that houses the earbuds, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal such as stainless steel, aluminum, and metal alloys, other suitable materials, or a combination of these materials. In some situations, parts or all of housing 12 may be formed from dielectric or other low-conductivity material such as glass, ceramic, plastic, and sapphire. In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays such as touch-sensitive and/or force-sensitive displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors such as force sensors coupled to a display to detect pressure applied to the display, temperature sensors, etc. In some configurations, keyboards, headphones, displays, pointing devices such as trackpads, mice, and joysticks, and other input-output devices may be coupled to device 10 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. The components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch or strip antenna structures, inverted-F antenna structures, slot antenna structures, planar inverted-F antenna structures, helical antenna structures, monopole antenna structures, dipole antenna structures, hybrids of these designs, etc. Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30. In other words, antenna(s) 30 may convey the radio-frequency signals for the transceiver circuitry. The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Radios 26 may use antenna(s) 30 to transmit and/or receive radio-frequency signals within different frequency bands at radio frequencies (sometimes referred to herein as communications bands or simply as a "bands"). The frequency bands handled by radios 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHZ), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired.

As just one example, the radios 26 in device 10 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10. This example is illustrative and, in general, radios 26 may include any desired combination of radios for covering any desired combination of RATs.

Radios 26 may use antenna(s) 30 to transmit and/or receive radio-frequency signals to convey wireless communications data between device 10 and external wireless communications equipment such as one or more electronic devices 10' (e.g., one or more other devices such as device 10, a wireless access point or base station, etc.) via communications link(s) 32. Wireless communications data may be conveyed by radios 26 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 26 may also use antenna(s) 30 to perform spatial ranging operations (e.g., for identifying a distance between device 10 and an external object). Radios 26 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

Configurations in which device 10 is a headset, headphone, earphone, or earbud are sometimes described herein as illustrative examples. In these configurations, one or more devices 10', with which device 10 performs wireless communications, may include a primary device such as a laptop computer, a desktop computer, a tablet computer, and/or a cellular telephone for which device 10 is an accessory. In an illustrative configuration in which device 10 is an earbud for one of a user's ears, device 10 may perform wireless communications with device 10' which may be an earbud for the other one of the user's ears. These configurations for devices 10 and 10' are illustrative. If desired, devices 10 and 10' may include any number of electronic devices that communicate with one another wirelessly.

The example of FIG. 1 is illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). Wireless circuitry 24 may include any desired number of antennas 30. Some or all of the antennas 30 in wireless circuitry 24 may be arranged into one or more phased antenna arrays for conveying radio-frequency signals over a steerable signal beam. If desired, antenna(s) 30 may be operated using a multiple-input and multiple-output (MIMO) scheme and/or using a carrier aggregation (CA) scheme.

Figure 2:
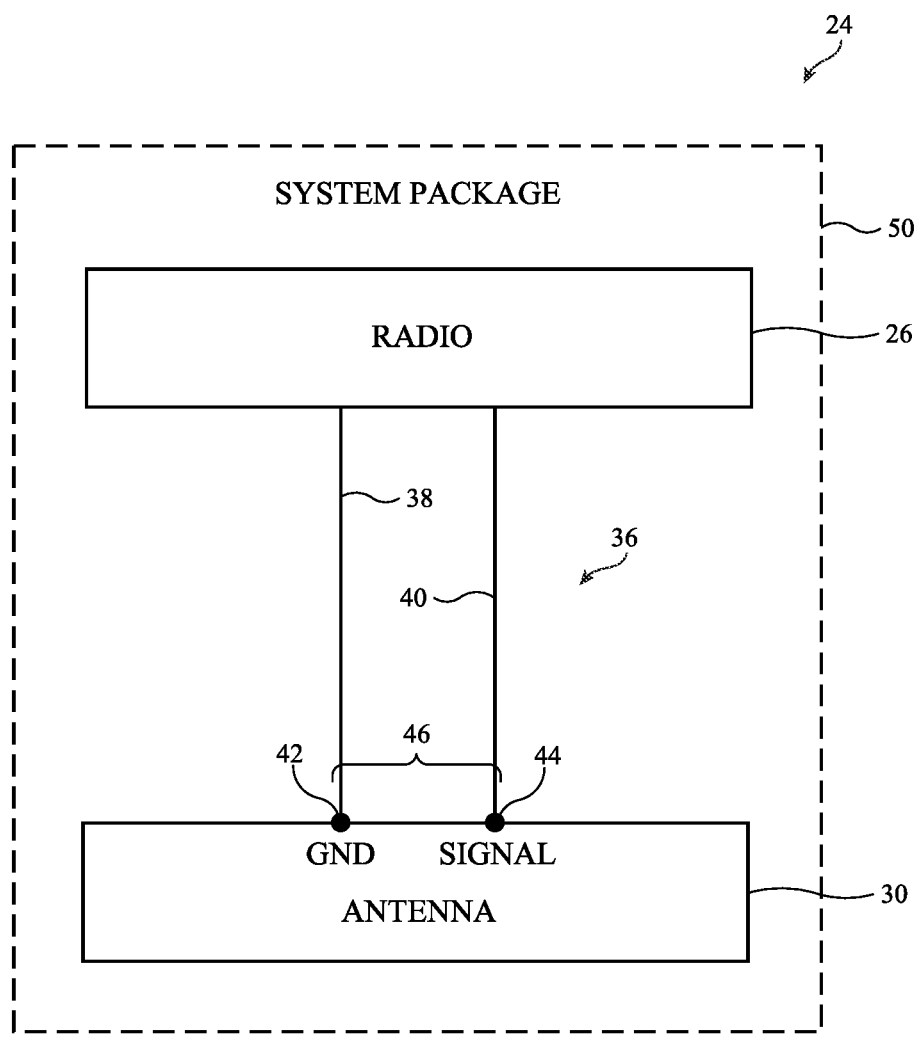
FIG. 2 is a block diagram of illustrative wireless circuitry having a radio coupled to an antenna in accordance with some embodiments.

FIG. 2 is a functional block diagram of wireless circuitry 24 of FIG. 1. As shown in FIG. 2, each radio 26 may be communicably coupled to one or more antennas 30 over one or more radio-frequency transmission lines 36. As an illustrative example, each radio-frequency transmission line 36 may include a ground conductor such as ground conductor 38 and a signal conductor such as signal conductor 40. Transmission line 36 may be coupled to a corresponding antenna 30 using an antenna feed such as antenna feed 46.

In particular, ground conductor 38 may be coupled to an antenna ground feed terminal 42 of feed 46 at an antenna ground structure of antenna 30. Signal conductor 40 may be coupled to an antenna signal feed terminal 44 of feed 46 at an antenna resonating element of antenna 30. In arrangements where an indirect electromagnetic coupling feed scheme is employed, signal conductor 40 may be coupled to an antenna signal feed terminal 44 at an antenna feed structure, which is electromagnetically coupled to an antenna resonating element of antenna 30.

One or more radio-frequency transmission lines 36 may be shared between radios 26 and/or antennas 30 if desired. Radio-frequency front end (RFFE) modules may be interposed on one or more radio-frequency transmission lines 36. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 36.

In some illustrative arrangements described herein as an illustrative example, wireless circuitry 24 such as radio 26 and/or antenna 30 may be mounted to one or more substrates. As illustrative examples, these substrates may include one or more package substrates to which one or more components and/or integrated circuit (IC) dies for a packaged system are mounted (e.g., implementing a system-in-package (SiP)), one or more interposer substrates in which conductive routing structures are formed to route signals between two or more of IC dies, packaged systems, printed circuits, etc. attached on opposing sides of the interposer substrate (e.g., implementing an interposer), and/or any other types of substrates such as an antenna dielectric support substrate. Because an illustrative SiP and an illustrative interposer may both include conductive (routing) traces, vias, and other structures, a SiP or an interposer may sometimes be referred to herein as a printed circuit and the substrate therein may sometimes be referred to herein as a printed circuit substrate.

These substrates may include substrates for rigid printed circuit boards and/or flexible printed circuits. As an example, a flexible printed circuit can include a flexible printed circuit substrate formed from polyimide, liquid crystal polymer, other flexible polymer materials, or other suitable materials. If desired, the flexible printed circuit may include multilayer laminated structures using layers of a conductive material such as copper and a dielectric material such as a resin that are laminated together without intervening adhesive. The multilayer laminated structures may, if desired, be folded or bent in two or three dimensions and may maintain a bent or folded shape after bending. As a further example, a rigid printed circuit board may include a (rigid) printed circuit substrate formed from rigid printed circuit board material such as fiberglass-filled epoxy or fiberglass-epoxy laminate, ceramics, other rigid polymer materials, or other suitable materials. If desired, a printed circuit substrate may be formed from one or more of these flexible and/or rigid materials at different portions of the substrate.

In the illustrative example of FIG. 2, radio 26 and antenna 30 may be incorporated into a (wireless) system package such as package 50. System package 50 may include a package substrate (as described above) to which radio component(s) such as one or more integrated circuits and/or other discrete components for radio 26 are mounted. Components may be soldered or otherwise physically and electrically connected to the package substrate. Antenna element(s) for antenna 30 may be patterned (e.g., as conductive traces) on a surface of the package substrate and/or disposed elsewhere on package 50 such as on an exterior-facing surface of package 50. If desired, system package 50 may include components other than components for wireless circuitry 24 such as other components of device 10 as shown in FIG. 1 (e.g., portions storage circuitry 16, portions of processing circuitry 18, etc.) that are mounted to the package substrate. The components on package 50 may be encapsulated to protect the components and/or their connections to the package substrate. System package 50 may have electrical contacts coupled to, mounted on, soldered onto, and/or otherwise connected to a system printed circuit substrate to connect other components within device 10 such as other components of device 10 as described in connection with FIG. 1.

Because wireless circuitry 24 such as radio 26 and/or antenna 30 is integrated onto an encapsulated package such as package 50, it may be difficult to provide an externally-exposed interface for accessing portions radio 26, antenna 30, and/or other portion of wireless circuitry 24 for calibration, testing, debugging and/or other purposes. The scenario in which radio 26 and antenna 30 are incorporated into an encapsulated package and are therefore difficult to access is illustrative of one potentially problematic scenario. In other arrangements, e.g., in which radio 26 and/or antenna 30 are enclosed within and/or physically embedded in other difficult-to-remove structures, it may be similarly difficult to access portions of wireless circuitry 24.

To facilitate access to portions of wireless circuitry 24 such as radio 26 and/or antenna 30, input-output interface circuitry can be provided. The input-output interface circuitry may provide selective connections to radio 26, antenna 30, and/or other portions of wireless circuitry 24, if desired. In addition to providing the interface for connecting to radio 26 and antenna 30, radio 26 and antenna 30 should still be configured to convey radio-frequency signals during normal operations (e.g., the various functions of wireless circuitry 24 described in connection with FIG. 1). Accordingly, to facilitate external access to radio 26 or antenna 30 during some modes of operation and to provide the desired connectivity between radio 26 and 30 during some modes of operation, wireless circuitry 24 may include a switch configured to be placed in different states (e.g., by control circuitry 14 in FIG. 1) to accommodate the different modes of operation.

Figure 3:
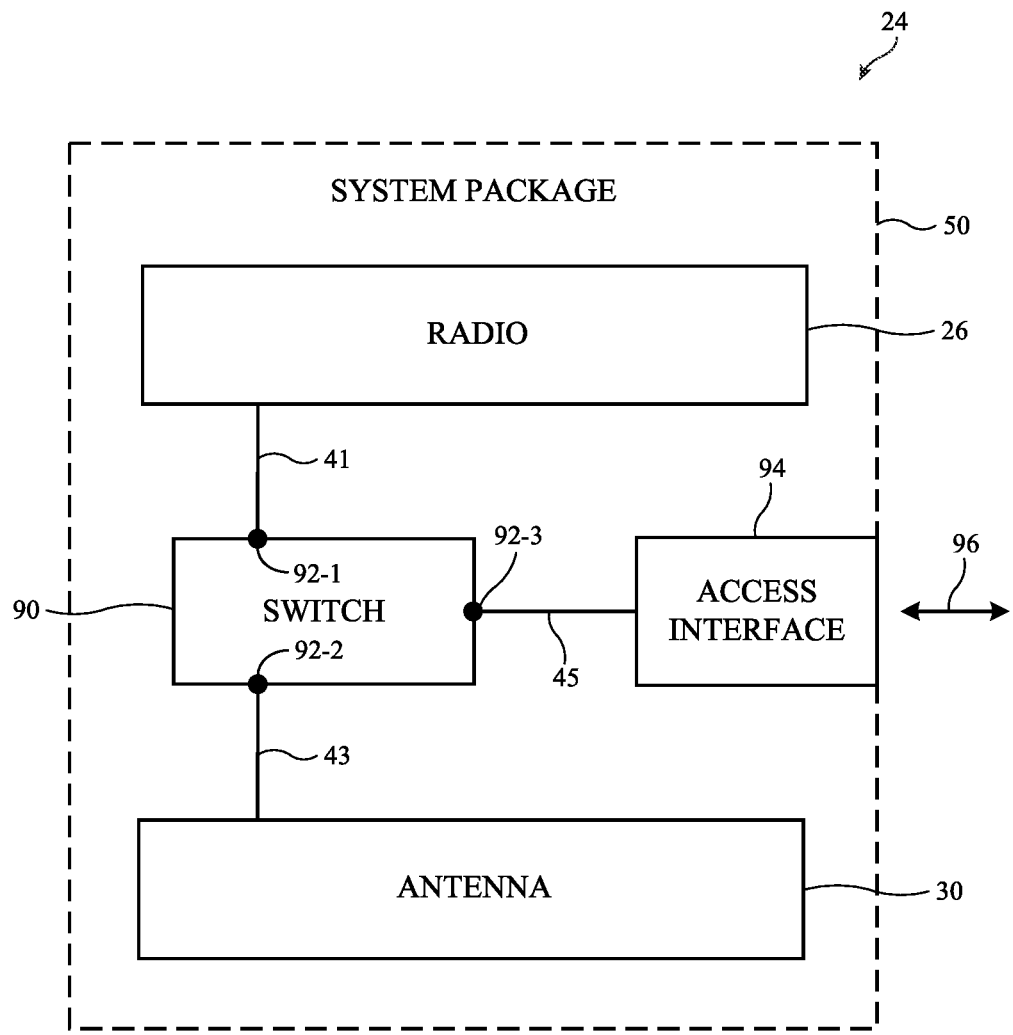
FIG. 3 is a block diagram of illustrative wireless circuitry having a switch coupled between an antenna, a radio, and an input-output interface for accessing the antenna and/or the radio in accordance with some embodiments.

FIG. 3 is a diagram showing an illustrative switch such as switch 90 that may be provided in wireless circuitry 24. Switch 90 may be coupled between a radio such as radio 26 and an antenna such as antenna 30, may be coupled between radio 26 and a package input-output interface such as access interface 94 (sometimes referred to as interface circuitry 94 or input-output interface 94), and may be coupled between antenna 30 and access interface 94. In particular, switch 90 may be a three-input-output-terminal switch (e.g., a switch having three data terminals). Switch 90 may additionally include one or more control terminals through which control signals to switch 90 are received. A first data terminal 92-1 of switch 90 may be coupled to radio 26 via a radio-frequency transmission line path 41 (e.g., a portion of signal conductor 40 in FIG. 2). A second data terminal 92-2 of switch 90 may be coupled to antenna 30 via a radio-frequency transmission line path 43 (e.g., another portion of signal conductor 40 in FIG. 2). A third data terminal 92-3 may be coupled to package input-output interface 94 via a radio-frequency transmission line path 45.

During a first mode of operation, switch 90 may electrically connect terminals 92-1 and 92-2 to connect radio-frequency transmission line paths 41 and 43 (forming transmission line 36), thereby connecting radio 26 and antenna 30 to convey radio-frequency signals therebetween.

Interface circuitry 94 may provide connections 96 to external components such as systems, external equipment, external devices, etc., external to system package 50. Accordingly, during a second mode of operation, switch 90 may electrically connect terminals 92-1 and 92-3 to connect radio-frequency transmission line paths 41 and 45, thereby connecting radio 26 and interface circuitry 94 to convey radio-frequency signals therebetween. As an example, during the second mode of operation, an external component such as test equipment may be connected to radio 26 via interface circuitry 94 and switch 90 to test the functionalities of radio 26.

During a third mode of operation, switch 90 may electrically connect terminals 92-2 and 92-3 to connect radio-frequency transmission line paths 43 and 45, thereby connecting antenna 30 to interface circuitry 94 to convey radio-frequency signals therebetween. As an example, during the third mode of operation, an external equipment such as calibration equipment may be connected to antenna 30 via interface circuitry and switch 90 to calibrate antenna 30 for normal operations.

These three modes of operations are described above as illustrative examples. If desired, the second or third modes of operation may be omitted. If desired, switch 90 may include additional terminals (e.g., terminals in addition to the three terminals shown in FIG. 3) coupled to additional radio components for wireless circuitry 24, and accordingly, switch 90 may be operated in additional mode(s) of operation to facilitate access to the additional radio components by external components via the same access interface 94 or an additional different access interface. If desired, switch 90 may be coupled to other portions of wireless circuitry 25 in package 50 instead of radio 26 and/or antenna 30.

While paths 41, 43, and 45 are each described above to be a radio-frequency transmission line path (e.g., a signal conductor path shielded with or generally in reference with ground conductor structures), this is illustrative of one exemplary configuration. If desired one or more (e.g., all) of paths 41, 43, and 45 may be a simple conductive path, e.g., on which a control signal and/or other types of signals may be used to convey signals with radio 26, antenna 30, or other portions of wireless circuitry 24.

Figure 4A:
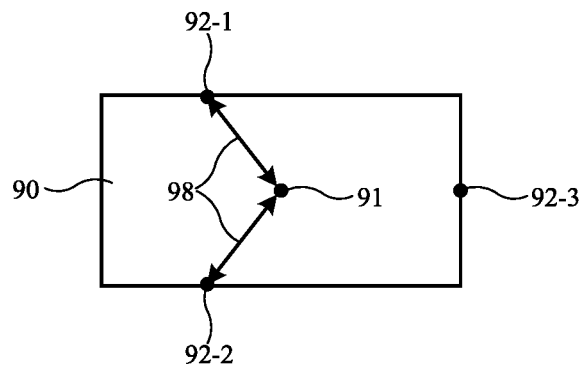
FIGS. 4A-4C are illustrative states of a switch coupled between an antenna, a radio, and interface circuitry in accordance with some embodiments.
Figure 4B:
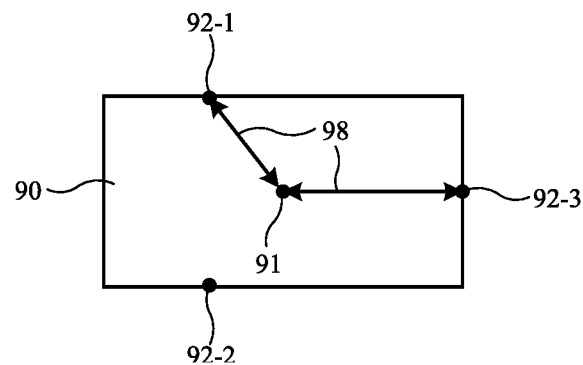
Figure 4C:
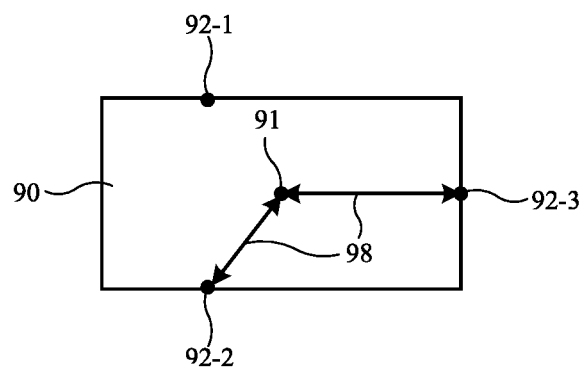

FIGS. 4A-4C show three illustrative states of switch 90 corresponding to the first, second, and third modes of operation described in connection with FIG. 3, respectively. As shown in FIGS. 4A-4C, switch 90 may have an internal connection point 91 (sometimes referred to as common connection point 91 or common node 91) to which each of external terminals 92-1, 92-2, and 92-3 can be connected.

In particular, when different pairs of the three terminals 92-1, 92-2, and 92-3 are connected to connection point 91, the switch may operate in different states. Switch 90 may provide a conductive path 98 between a corresponding terminal 92 and connection point 91 using any suitable structures. If desired, a transistor may be provided between each terminal 92 and connection point 91 to selectively provide each of the three conductive paths 98. If desired, other types of circuits may be used to present the pair of desired conductive paths 98 in response to one or more control signals.

As shown in FIG. 4A, in a first state of switch 90, terminal 92-1 may be electrically connected or shorted to connection point 91 and terminal 92-2 may be electrically connected or shorted to connection point 91 via respective conductive paths 98. In this first state of switch 90, terminal 92-3 may be disconnected from connection point 91 to form an open circuit between connection point 91 and terminal 92-3. Accordingly, radio 26 coupled to terminal 92-1 is connected to antenna 30 coupled to terminal 92-1 via a short circuit path through connection point 91 and disconnected from interface circuitry 94 in this first switch state. As an illustrative example, control circuitry 14 (FIG. 1) may send a control signal indicative of this first state (one or more control terminals of) to switch 90 and switch 90 may provide the two conductive paths 98 while removing any conductive path 98 between connection point 91 and terminal 92-3 in response to the control signal.

As shown in FIG. 4B, in a second state of switch 90, terminal 92-1 may be electrically connected or shorted to connection point 91 and terminal 92-3 may be electrically connected or shorted to connection point 91 via respective conductive paths 98. In this second state of switch 90, terminal 92-2 may be disconnected from connection point 91 to form an open circuit between connection point 91 and terminal 92-2. Accordingly, radio 26 coupled to terminal 92-1 is connected to interface circuitry 94 coupled to terminal 92-3 by a short circuit path through connection point 91 and disconnected from antenna 30 in this second switch state. As an illustrative example, control circuitry 14 (FIG. 1) may send a control signal indicative of this second state to (one or more control terminals of) switch 90 and switch 90 may provide the two conductive paths 98 while removing any conductive path 98 between connection point 91 and terminal 92-2 in response to the control signal.

As shown in FIG. 4C, in a third state of switch 90, terminal 92-2 may be electrically connected or shorted to connection point 91 and terminal 92-3 may be electrically connected or shorted to connection point 91 via respective conductive paths 98. In this third state of switch 90, terminal 92-1 may be disconnected from connection point 91 to form an open circuit between connection point 91 and terminal 92-1. Accordingly, antenna 30 coupled to terminal 92-2 is connected to interface circuitry 94 coupled to terminal 92-3 by a short circuit path via connection point 91 and disconnected from radio 26 in this third switch state. As an illustrative example, control circuitry 14 (FIG. 1) may send a control signal indicative of this first state to (one or more control terminals of) switch 90 and switch 90 may provide the two conductive paths 98 while removing any conductive path 98 between connection point 91 and terminal 92-1 in response to the control signal.

As described above, control circuitry 14 (FIG. 1) may provide control signals to switch 90 to place switch 90 in the first, second, or third states. In particular, control circuitry 14 may place switch 90 in the first state to connect radio 26 to antenna 30 during normal operations of wireless circuitry 24 such as when conveying radio-frequency signals to provide wireless communication functionalities for device 10 (e.g., the functionalities described in connection with wireless circuitry 24 in FIG. 1). If desired, control circuitry 14 may place switch 90 in the second or third states to connect portions of wireless circuitry 24 to interface circuitry 94 during calibration, testing, debugging, and/or other operations that desire access to a corresponding portion of wireless circuitry 24 such as radio 26 or antenna 30. These examples are merely illustrative. In general, control circuitry 14 may place switch 90 in the second or third states to provide any type of external system or circuitry with access to radio 26 or antenna 30.

Figure 5:
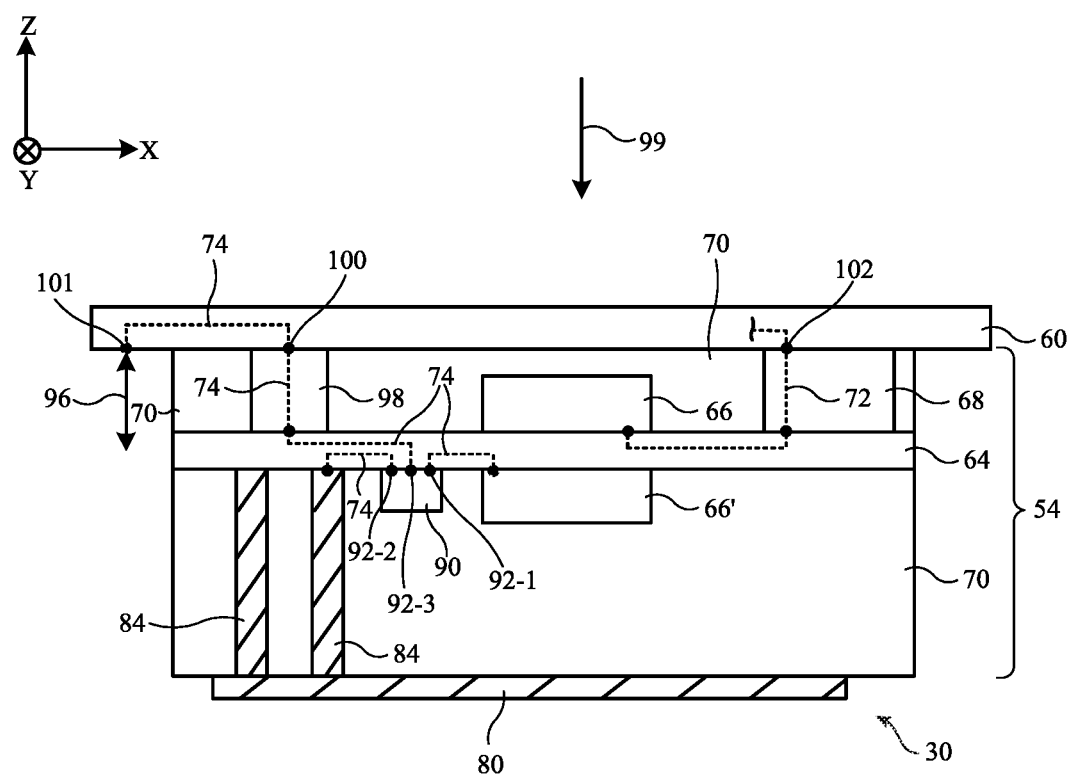
FIG. 5 is a side view of an illustrative wireless system package that includes an access switch in accordance with some embodiments.

FIG. 5 is an illustrative system package such as package 54, which may be one illustrative implementation of package 50 in FIG. 3, that can be incorporated into device 10 (FIG. 1). System package 54 (sometimes referred to as integrated circuit package 54) may include a package substrate such as printed circuit substrate 64 and multiple components 66 (including components 66') mounted to one or both sides of package substrate 64. Substrate 64 may be a rigid printed circuit substrate or may, if desired, be any other suitable type of substrate (e.g., a flexible printed circuit substrate).

Components 66 mounted to package substrate 64 may include one or more integrated circuit dies (e.g., each implementing one or more of storage circuitry 16, processing circuitry 18, radio(s) 26, signal processing circuitry and driver circuitry for one or more input-output devices, power management circuitry, clock management circuitry, or other functional circuitry), other active components (e.g., input-output devices 22, programmable devices, diodes, other semiconductor devices, etc.), passive components (e.g., resistors, capacitors, inductors, etc.), electromechanical components, and any other suitable discrete devices. Configurations in which system package 54 includes one or more integrated circuit dies that implement corresponding functional subsystems thereby forming one or more of control circuitry, wireless circuitry, other non-wireless or non-radio input-output circuitry, and other functional circuitry all within system package 54 are described herein as an illustrative example. In this example, package 54 may form a system-in-package (SiP).

System package 54 may be encapsulated. As shown in FIG. 5, components 66 on a first side of substrate 64 are covered and surrounded by encapsulation 70 and components 66 on a second side of substrate 64 are also covered and surrounded by encapsulation 70. If desired, an electromagnetic shielding layer may be deposited on one or more (e.g., substantially all exterior facing) sides of encapsulation 70. The shielding layer may shield components in system package 54 from undesired electromagnetic interference.

Encapsulation 70 may include encapsulation material, underfill material, molding material, and/or other sealant or encapsulant materials. Encapsulation 70 may be formed from any suitable number and type of encapsulant material such as plastics or specifically thermoplastics, ceramics, other dielectrics, etc. Similarly, any suitable process such as spin-on, molding, underfill, etc., may be used to form encapsulation 70, and the shielding layer thereon if present.

In an illustrative configuration in which package 54 is encapsulated to protect against undesired weathering, temperature, and electromagnetic effects, an interposer such as interposer 68 can serve as the an electrical input-output interface through which components 66 on the system package are accessed by and communicate with other components in device 10. In particular, connections to a system substrate 60 may be made through exterior-facing contacts (e.g., contacts 102) on one side of interposer 68, while connections to package substrate 64 may be made through contacts on the opposing side of interposer 68. In the example of FIG. 5, conductive signal paths 72 may connect system substrate 60 to components 66 through interposer 68 and package substrate 64.

Some of components 66 mounted to substrate 64 such as component(s) 66' may implement radio 26 covering one or more RATs (e.g., an integrated circuit die that includes one or more radios, one or more processors that implement radio 26, a radio-frequency front end module, etc.). A radio-frequency transmission line such as radio-frequency transmission line 36 (FIG. 2), and if desired, one or more additional radio-frequency transmission lines, may couple radio 26 (e.g., component 66' implementing radio 26) to one or more antennas 30.

In the example of FIG. 5, one or more conductive paths 74 on substrate 64 may form radio-frequency transmission line paths (e.g., for transmission line 36 in FIG. 2). Each conductive path 74 may include a signal conductor shielded by, overlapped by, and/or generally in reference to one or more ground conductors. The ground conductor may connect component 66' implementing radio 26 to one or more ground structures in device 10 such as ground traces on substrate 64, conductive housing structures, one or more batteries, etc. The signal conductor may connect component 66' implementing radio 26 to an antenna element such as an antenna feed structure and/or an antenna resonating element.

As an example, radio component 66' may implement an integrated circuit die forming one or more processors for radio 26 (sometimes referred to herein as a radio-frequency module). The radio component 66' may be coupled to transmission line structures formed using paths 74. If desired, a separate radio component 66' implementing a front end module (e.g., impedance matching circuitry) may be coupled along one or more of paths 74.

As described above, one or more components 66' within package 62 may form radio 26 connected to antenna 30. In particular, one or more conductive structures 84 may serve as a feed structure coupled to conductive structure 80 forming one or more antenna resonating elements. The transmission line structures formed by paths 74 may couple radio component 66' to antenna feed structure(s) 84. As examples, the transmission line structures may be formed based on a microstrip transmission line, a stripline transmission line, and/or any other suitable types of transmission lines. Antenna feed structure 84 may be formed as vias or pins embedded within encapsulation 70. In other configurations, antenna feed structure 84 may be or include conductive traces on an exterior of an antenna carrier structure on which conductive structure 80 is disposed (in place of encapsulation 70 or in addition to encapsulation 70). Conductive structures 84, if desired, may also form other antenna element such as one or more antenna return paths coupling an antenna resonating element to an antenna ground.

In the example of FIG. 5, conductive structure 80 (e.g., one or more antenna resonating elements) is disposed on top of encapsulation 70 on the system package. Alternatively, conductive structure 80 may be formed (e.g., patterned) on one or more dielectric layers forming an antenna support structure, where the dielectric support structure is interposed between encapsulation 70 and conductive structure 80. As an example, the dielectric antenna support structure may be a plastic carrier and conductive structure 80 may be patterned and electroplated onto the plastic carrier using a laser direct structuring (LDS) process. If desired, the dielectric antenna support structure may be a printed circuit substrate or other dielectric substrate and conductive structure 80 may be formed as conductive traces or a conductive layer on the substrate. These examples are illustrative of some of many possible arrangements.

If desired, conductive element 80 may be provided in other suitable manners. In particular, conductive structure 80 may be disposed within package 54 instead being provided on an exterior surface of package 54. In particular, conductive structure 80 may be formed within encapsulation 70 (using one or more layers within encapsulation 70 as the antenna support structure). In this arrangement, a window in the electromagnetic shielding layer (if present) may overlap the one or more portions (e.g., the entirety) of conductive structure 80 to enable conveyance of radio-frequency signals through the electromagnetic shielding layer.

System package 54 as described in connection with FIG. 5 may be mounted to a system substrate 60. Substrate 60 may be a rigid printed circuit board substrate, a flexible printed circuit substrate, a hybrid rigid-flexible printed circuit substrate, or any other suitable type of substrate. In some implementations described herein as an illustrative example, substrate 60 may be a flexible printed circuit substrate for a main system printed circuit which provides structural support and signal routing to and from different functional components or subsystems in device 10. In these arrangements, system substrate 60 may extend across substantially the entirety of device 10 such as from one end of housing 12 (FIG. 1) to the opposing end of housing 12.

Other components forming other functional subsystems such as those forming one or more input-output devices such as sensors, speakers, microphones, etc., wireless circuitry, control circuitry, power management circuitry, one or more batteries, or other device components may also be mounted to substrate 60. Connections such as buses or other conductive paths 72 in substrate 60 may convey signals between these components, e.g., to and from system package 54 in the example of FIG. 5. Conductive structures such as conductive metal traces, conductive metal vias, interconnect layers, routing layers, etc., may be disposed on (e.g., embedded within, disposed on one or more external surfaces of, or disposed in other manners on one or more portions of) substrate 60 to form these conductive signal paths.

Implemented in the manner described above, the internals of system package 54 may be sealed off with encapsulation 70 and interposer 68 is generally used to facilitate connections to non-radio components (e.g., non-radio-frequency paths 72). Accordingly, it may be difficult to access radio components 66' and/or antenna 30 that are embedded within system package 54. Accordingly, a switch such as switch 90 (as described in connection with FIGS. 3 and 4) may be mounted to substrate 64 or generally incorporated within system package 54. Terminals 92-1, 92-2, and 92-3 of switch 90 may be respectively coupled to radio component 66' (e.g., implementing a radio-frequency module or radio 26), antenna 30 (e.g., an antenna feed structure 84 coupled to an antenna resonating element formed from conductive structure 80), and input-output interface circuitry (e.g., interface circuitry 94 in FIG. 3) for the radio-frequency components.

In some configurations described herein as an example, the package input-output interface circuitry for the radio-frequency components is formed from an additional interposer 98 through which radio-frequency signals can be conveyed (e.g., using conductive paths 74). Accordingly, external components such as components external to the system package, components external to device 10 (e.g., calibration equipment, testing equipment, debugging equipment, etc.), and/or other any suable components may be connected to antenna 30 and radio 26 implemented within system package 54 through interposer 98 of package 54.

In the example of FIG. 5, interposer 98 may have one or more contacts on a first side physically and electrically connected to substrate 64 (and connected to terminal 92-3) and may have one or more package-exterior-facing contacts (e.g., contacts 100) on an opposing side physically and electrically connected to substrate 60. Internal routing paths within interposer 98 may connect contact(s) on one side to contact(s) on the other side. Paths 74 may be provided on substrate 60. If desired, substrate 60 may itself have contacts 101 (e.g., contact pads, pins, sockets, terminals, etc.) at which paths 74 terminate. As shown in FIG. 5, contacts 101 on substrate 60 may connect to exterior-facing contacts 100 via paths 74 and external components may connect (via connection 96) to radio 26 and/or antenna 30 implemented on package 54 via contacts 101 on substrate 60.

While in the example of FIG. 5 the input-output interface circuitry is provided using interposer 98, this is illustrative of one of many possible implementations for the package input-output interface circuitry. If desired, package-exterior-facing contact pads, pins, sockets, terminals and/or any other suitable signal carrying structures may provide suitable connections to terminal 92-3 of switch 90 to facilitate connection to antenna 30 and/or radio 26 within system package 54.

As described above in connection with FIGS. 3 and 4, control circuitry 14 (e.g., mounted on substrate 64) may provide control signals to switch 90 during different modes of operation to place switch 90 in different states, thereby facilitating different types of connections between component 66', antenna feed structure 84, and interposer 98.

Figure 6:
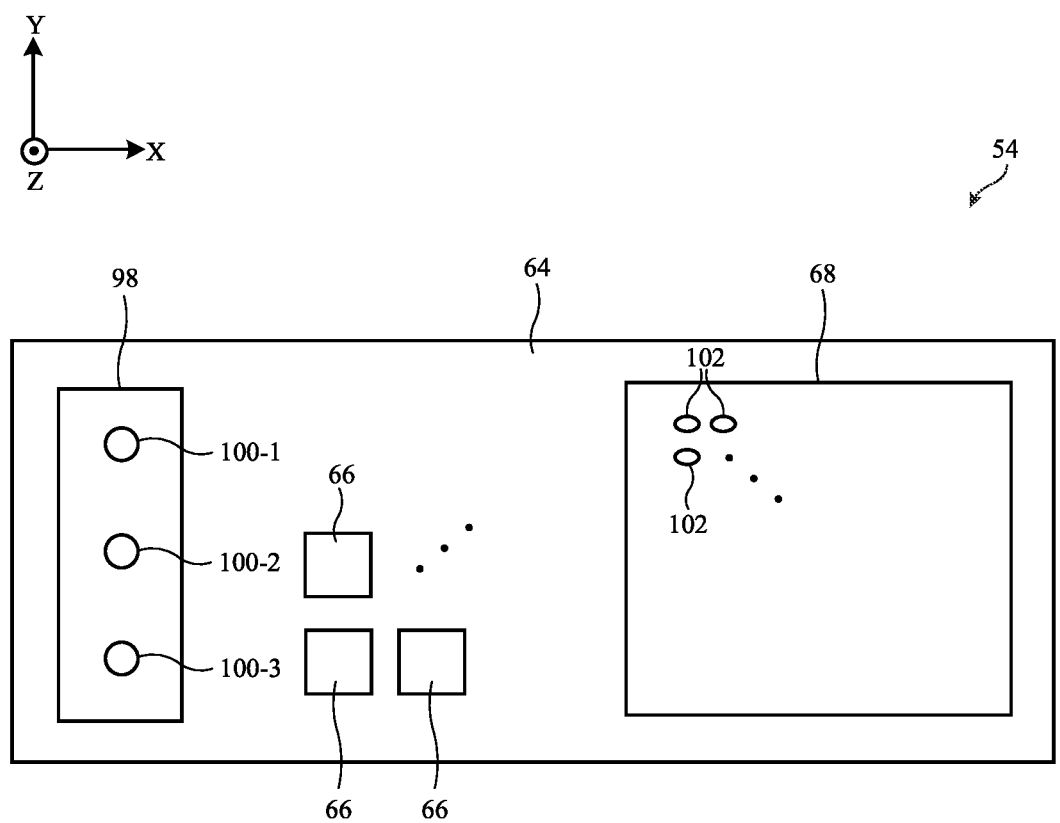
FIG. 6 is a plan view of an illustrative wireless system package that includes an interposer through which wireless circuitry can be accessed via the access switch in accordance with some embodiments.

FIG. 6 is a plan view of system package 54 described in connection with FIG. 5 when viewed in direction 99 (with substrate 60 and/or other element such as encapsulation 70 removed). As shown in FIG. 6, interposer 98 may include multiple package-exterior-facing electrical contacts 100 such as contacts 100-1, 100-2, and 100-3. These contacts (e.g., contact pads, contact pins, sockets, and/or other types of contacts for making physical and electrical connections) may be coupled to respective paths 74 on the interior of package 54 and on substrate 60 (FIG. 5). In some illustrative configurations described herein as an example, contacts 100-1 and 100-3 may be ground contacts while contact 100-2 may be a signal contact. Accordingly, contacts 100-1 and 100-3 may be coupled to respective ground conductors of a radio-frequency transmission line while contact 100-2 may be coupled to a signal conductor of the radio-frequency transmission line.

As further shown in FIG. 6, interposer 68 may similarly provide multiple package-exterior-facing electrical contacts such as contacts 102. Rather than connecting to switch 90 and/or radio-frequency components, contacts 102 (e.g., contact pads, contact pins, sockets, and/or other types of contacts for making physical and electrical connections) may connect to other non-radio components 66 on substrate 64 within the system package and to corresponding signal paths 72 on substrate 60.

The implementation described in connection with FIGS. 5 and 6 for switch 90 and/or access interface circuitry 94 for radio-frequency components (e.g., implemented using interposer 98) is illustrative of one of many possible implementations. If desired, switch 90 and/or access interface circuitry may be provided in other manners and/or in other systems.

Figure 7:
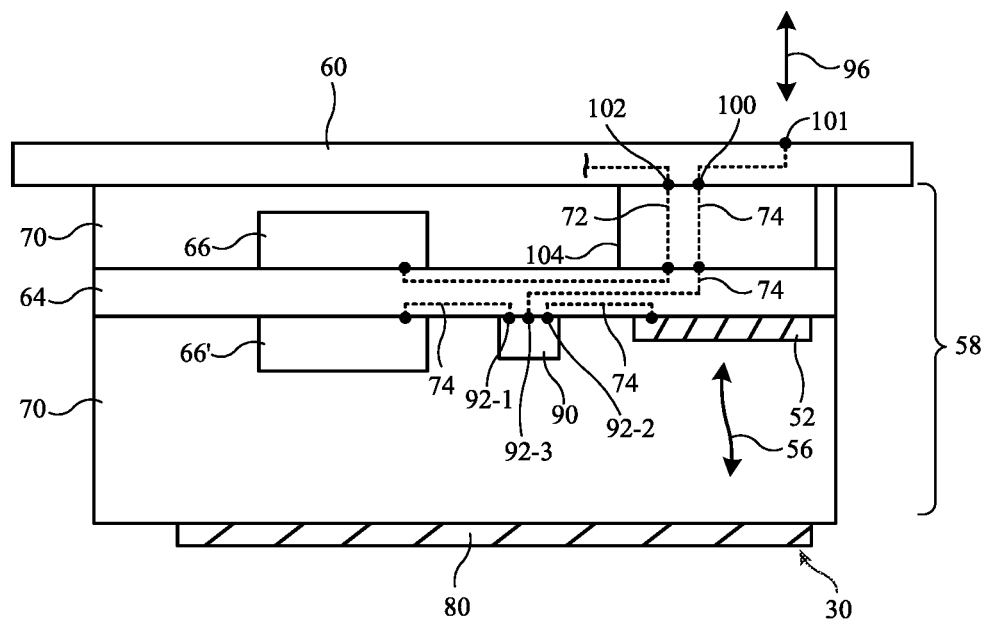
FIG. 7 is a side view of an illustrative wireless system package that includes a combined interposer in accordance with some embodiments.

FIG. 7 show another illustrative system package such as package 58 in which switch 90 and/or access interface circuitry for radio-frequency components may be provided.

Package 58 may be another illustrative implementation of package 50 in FIG. 3 that can be incorporated into device 10 (FIG. 1). In the example of FIG. 7, an indirect electromagnetic coupling antenna feeding scheme is implemented in contrast to the direct antenna feeding scheme described in connection with FIG. 5.

As shown in FIG. 7, conductive paths 74 for transmission line structures may be coupled to a conductive feed structure 52 to indirectly feed one or more antenna resonating elements formed using conductive structure 80 via electromagnetic coupling 56. Antenna feed structure 52 may be formed on package substrate 64. As examples, feed structure 52 may be a conductive patch that is deposited, patterned, and/or otherwise disposed on package substrate 64. Feed element 52 may be formed from conductive metal traces embedded within or on a surface of printed circuit substrate 64. Based on radio-frequency signals conveyed from radio 26 (e.g., formed from component(s) 66') to feed element 52 through the transmission line structures, antenna currents may be present on feed element 52. These antenna currents on feed element 52 may excite one or more antenna resonating elements on conductive structure 80 through wireless coupling 56, thereby producing corresponding antenna current on conductive structure 80 from which radio-frequency signals are conveyed. In an analogous manner, radio-frequency signals 82 received at conductive structure 80 may induce, via wireless coupling 56, corresponding antenna currents on feed element 52 that are conveyed to radio 26.

Because one or more antenna resonating elements on conductive structure 80 are fed through wireless coupling 56, conductive structure 80 may be disposed in any suitable manner that provides sufficient coupling between feed element 52 and the antenna resonating elements. As an example, one or more antenna performance metrics (e.g., associated with antenna gain, antenna bandwidth, antenna impedance, etc.) associated with each antenna resonating elements being above corresponding threshold values may be indicative of sufficient coupling.

In configurations in which an electromagnetic shielding layer is provided over encapsulation 70, a window or opening may be provided in the shielding layer to allow for and/or improve wireless coupling 56 between feed element 52 and antenna 30. In other words, the window in the shielding layer may at least partially overlap feed element 52.

In the example of FIG. 7, the input-output interface circuitry for radio components and antenna 30 and the input-output interface circuitry for non-radio components may share an interposer 104 for connecting to and accessing internal components of package 58. As shown in FIG. 7, interposer 104 may include conductive path(s) 72 to non-radio-frequency components 66 and may include conductive path(s) 74 to radio-frequency components (e.g., via terminal 92-3 of switch 90).

The examples shown in FIGS. 5-7 are illustrative of some possible implementations for the access switch and/or interface circuitry described herein. If desired, other implementations may be used. As examples, the combined interposer 104 described in connection with FIG. 7 (instead of interposers 68 and 98 in FIGS. 5 and 6) may be utilized in system package 54 (FIGS. 5 and 6) employing a direct antenna feeding scheme, the separate interposers 68 and 98 described in connection with FIGS. 5 and 6 (instead of combined interposer 104 in FIG. 7) may be utilized in system package 58 (FIG. 7) employing an indirect electromagnetic antenna feeding scheme, etc. If desired, the use of the access switch and/or input-output interface circuitry may be provided in other types of wireless systems, in other types of packages, and/or generally in other contexts.

The foregoing is illustrative of some of many possible arrangements and various modifications can be made to the described embodiments. The foregoing embodiments may be implemented individually or in any combination.

What is claimed is:

1. An electronic device comprising:
   a radio;
   an antenna coupled to the radio;
   an input-output interface for connecting to at least one of the radio and the antenna; and
   a switch having a first terminal coupled to the radio, a second terminal coupled to the antenna, and a third terminal coupled to the input-output interface.

2. The electronic device of claim 1, wherein the switch has a connection point to which each of the first, second, and third terminals is selectively coupled.

3. The electronic device of claim 2 further comprising:
   control circuitry configured to place the switch in a first state in which the first terminal and the second terminal are coupled to the connection point and the third terminal is decoupled from the connection point to convey radio-frequency signals between the radio and the antenna.

4. The electronic device of claim 3, wherein the control circuitry is configured to place the switch in a second state in which the first terminal and the third terminal are coupled to the connection point and the second terminal is decoupled from the connection point to convey radio-frequency signals between the radio and the input-output interface.

5. The electronic device of claim 4, wherein the control circuitry is configured to place the switch in a third state in which the second terminal and the third terminal are coupled to the connection point and the first terminal is decoupled from the connection point to convey radio-frequency signals between the antenna and the input-output interface.

6. The electronic device of claim 1 further comprising:
   a printed circuit substrate on which the radio is mounted; and
   encapsulation over the printed circuit substrate and the radio, wherein the radio is coupled to the first terminal of the switch via a first conductive path on the printed circuit substrate.

7. The electronic device of claim 6, wherein the printed circuit substrate, the radio, and the encapsulation form a system package, and the antenna is disposed on the system package, and the antenna is coupled to the second terminal of the switch via a second conductive path on the printed circuit substrate.

8. The electronic device of claim 7, wherein the switch is mounted on the printed circuit substrate.

9. The electronic device of claim 8 further comprising:
   a system substrate to which the system package is mounted, wherein the input-output interface comprises an interposer coupled between the printed circuit substrate and the system substrate.

10. The electronic device of claim 9, wherein the interposer is coupled to the third terminal of the switch via a third conductive path on the printed circuit substrate.

11. The electronic device of claim 10, wherein the interposer comprises one or more electrical contacts connected to the system substrate and one or more components of the electronic device are configured to connect to at least one of the radio and the antenna via the system substrate and the one or more electrical contacts.

12. The electronic device of claim 1, wherein the radio is coupled to the first terminal of the switch using a first radio-frequency transmission line path, the antenna is coupled to the second terminal of the switch using a second radio-frequency transmission line path, and the input-output interface is coupled to the third terminal of the switch using a third radio-frequency transmission line path.

13. The electronic device of claim 1, wherein the switch is a three-input-output-terminal switch.

14. An integrated circuit package comprising:
a substrate;
a radio component on the substrate;
an antenna coupled to the radio component;
an interposer on the substrate; and
a switch on the substrate and having a first terminal coupled to the radio component, a second terminal coupled to the antenna, and a third terminal coupled to the interposer.

15. The integrated circuit package of claim 14 further comprising:
encapsulation over the substrate, the radio component, and the switch, wherein the interposer comprises an external electrical contact connected to the third terminal of the switch.

16. The integrated circuit package of claim 15, wherein the antenna includes a feed structure on the substrate coupled to the second terminal of the switch and the antenna includes an antenna resonating element disposed on the encapsulation and coupled to the feed structure.

17. The integrated circuit package of claim 15, wherein the radio component comprises a radio integrated circuit, the integrated circuit package further comprising:
one or more non-radio integrated circuits on the substrate, wherein the encapsulation is disposed over the one or more non-radio integrated circuits.

18. Wireless circuitry comprising:
a radio-frequency module;
an antenna coupled to the radio-frequency module;
interface circuitry coupled to the radio-frequency module and coupled to the antenna; and
a switch having a first state in which the switch connects the radio-frequency module to the antenna, a second state in which the switch connects the radio-frequency module to the interface circuitry, and a third state in which the switch connects the antenna to the interface circuitry.

19. The wireless circuitry of claim 18, wherein the interface circuitry comprises at least a ground contact and a signal contact, the signal contact configured to connect to the radio-frequency module when the switch is in the second state and configured to connect to the antenna when the switch is in the third state.

20. The wireless circuitry of claim 18 further comprising:
a substrate to which the radio-frequency module, the interface circuitry, and the switch are mounted.

* * * * *